US009582522B2

(12) United States Patent
Konik et al.

(10) Patent No.: US 9,582,522 B2
(45) Date of Patent: *Feb. 28, 2017

(54) MANAGEMENT OF DATABASE ALLOCATION DURING REORGANIZATION

(71) Applicant: International Business Machines Corporation, Armonk, NY (US)

(72) Inventors: Rafal P. Konik, Oronoco, MN (US); Roger A. Mittelstadt, Byron, MN (US); Brian R. Muras, Rochester, MN (US); Mark W. Theuer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 251 days.

This patent is subject to a terminal disclaimer.

(21) Appl. No.: 13/796,796

(22) Filed: Mar. 12, 2013

(65) Prior Publication Data

US 2014/0229430 A1    Aug. 14, 2014

Related U.S. Application Data

(63) Continuation of application No. 13/764,040, filed on Feb. 11, 2013.

(51) Int. Cl.
*G06F 17/30* (2006.01)
(52) U.S. Cl.
CPC .. *G06F 17/30289* (2013.01); *G06F 17/30339* (2013.01)

(58) Field of Classification Search
CPC ......... G06F 17/30289; G06F 17/30578; G06F 17/30306; G06F 17/30339; G06F 17/30312; G06F 17/30315; G06F 17/30412
See application file for complete search history.

(56) References Cited

U.S. PATENT DOCUMENTS

| 5,596,747 | A | * | 1/1997 | Katabami et al. ............ 707/687 |
| 5,721,915 | A | * | 2/1998 | Sockut et al. |
| 5,761,667 | A | * | 6/1998 | Koeppen |
| 5,787,409 | A | * | 7/1998 | Seiffert et al. .................. 706/45 |
| 5,940,832 | A | * | 8/1999 | Hamada et al. |
| 5,960,431 | A | * | 9/1999 | Choy |

(Continued)

*Primary Examiner* — James Trujillo
*Assistant Examiner* — Hubert Cheung
(74) *Attorney, Agent, or Firm* — Peter J. Edwards

(57) ABSTRACT

A method and computer-readable storage media are provided for reorganizing a database. The method may monitor the database to determine whether the database reorganization is required. The method may also include determining the database reorganization is required. The method may further include determining a first and second amount of space to add to the database for additional entries of a category of data according to a first and second predictive sizing calculation. The method may further include the selecting of either the first or second amount of space to add to the database for additional entries of the category of data during the reorganization. The method may further include performing the reorganization of the database including allocating the selected amount of space to add to the database for additional entries in the database of the category of data by using the computer system operatively coupled to the storage device.

9 Claims, 6 Drawing Sheets

(56) References Cited

U.S. PATENT DOCUMENTS

| | | | |
|---|---|---|---|
| 6,292,795 B1* | 9/2001 | Peters et al. | |
| 6,418,443 B1* | 7/2002 | Martin, Jr. | |
| 6,622,142 B1* | 9/2003 | Murray et al. | |
| 6,799,253 B1* | 9/2004 | Peterson | 711/150 |
| 7,228,309 B1* | 6/2007 | Fisher | |
| 7,657,584 B2* | 2/2010 | Kawamura et al. | 707/610 |
| 7,720,876 B2 | 5/2010 | Maxfield | |
| 8,271,457 B2 | 9/2012 | Vos et al. | |
| 2002/0087587 A1* | 7/2002 | Vos et al. | 707/203 |
| 2002/0143763 A1* | 10/2002 | Martin et al. | 707/7 |
| 2003/0056082 A1* | 3/2003 | Maxfield | 712/4 |
| 2004/0078541 A1* | 4/2004 | Lightstone et al. | 711/171 |
| 2004/0153777 A1* | 8/2004 | Sugimoto et al. | 714/25 |
| 2005/0086195 A1* | 4/2005 | Tan et al. | 707/1 |
| 2005/0165713 A1* | 7/2005 | Lafforet | 707/1 |
| 2006/0036618 A1* | 2/2006 | Shuma et al. | 707/100 |
| 2006/0143238 A1* | 6/2006 | Tamatsu | 707/200 |
| 2006/0161579 A1* | 7/2006 | Venguerov | G06Q 10/00 |
| 2006/0212821 A1* | 9/2006 | Charles et al. | 715/764 |
| 2007/0143380 A1* | 6/2007 | Plow | G06F 17/30339 |
| 2007/0198591 A1* | 8/2007 | Teng et al. | 707/200 |
| 2007/0288414 A1* | 12/2007 | Barajas | G06N 7/00 706/46 |
| 2010/0287354 A1* | 11/2010 | Lehr | G06F 3/0608 711/171 |
| 2012/0005449 A1* | 1/2012 | Reed et al. | 711/171 |
| 2012/0089566 A1* | 4/2012 | Effern | G06F 17/30377 707/611 |
| 2012/0124056 A1 | 5/2012 | Egan et al. | |
| 2012/0290588 A1* | 11/2012 | Egan et al. | 707/752 |
| 2013/0080725 A1* | 3/2013 | Usui | 711/162 |
| 2014/0046920 A1* | 2/2014 | Shuma | 707/705 |

* cited by examiner

MANAGEMENT OF DATABASE ALLOCATION DURING REORGANIZATION

CROSS-REFERENCE TO RELATED APPLICATIONS

This application is a continuation of co-pending U.S. patent application Ser. No. 13/764,040, filed Feb. 11, 2013. The aforementioned related patent application is herein incorporated by reference in its entirety.

TECHNICAL FIELD

This disclosure generally relates to computing systems, and in particular, to a database management system.

BACKGROUND

Databases are used to store information for numerous types of applications. Examples include various industrial, commercial, technical, scientific, and educational applications. Database management systems (DBMSs) are a typical mechanism for accessing data stored in a database. DBMSs may use a model in which data is first stored and indexed in a memory before subsequent querying, accessing, or analysis. Databases may contain large amounts of data, which may create performance issues when a user queries the database for specific information. Organization and formatting of the data and the index may affect the system performance, reliability, power usage, durability, and user experience.

SUMMARY

In one embodiment, a method is provided for reorganizing a database. The method may monitor the database to determine whether the database reorganization is required. The method may also include determining the database reorganization is required. The method may further include determining a first and second amount of space to add to the database for additional entries of a category of data according to a first and second predictive sizing calculation. The method may further include the selecting of either the first or second amount of space to add to the database for additional entries of the category of data during the reorganization. The method may further include performing the reorganization of the database including allocating the selected amount of space to add to the database for additional entries in the database of the category of data by using the computer system operatively coupled to the storage device.

In another embodiment, a computer-readable storage media is provided for reorganizing a database. The computer-readable storage media may provide for monitoring the database to determine whether the database reorganization is required. The method may also include determining the database reorganization is required. The method may further include determining a first and second amount of space to add to the database for additional entries of a category of data according to a first and second predictive sizing calculation. The method may further include the selecting of either the first or second amount of space to add to the database for additional entries of the category of data during the reorganization. The method may further include performing the reorganization of the database including allocating the selected amount of space to add to the database for additional entries in the database of the category of data by using the computer system operatively coupled to the storage device.

BRIEF DESCRIPTION OF THE DRAWINGS

Embodiments are illustrated by way of example, and not by way of limitation, in the figures of the accompanying drawings in which like reference numerals refer to similar elements or steps.

DETAILED DESCRIPTION

Figure 1:
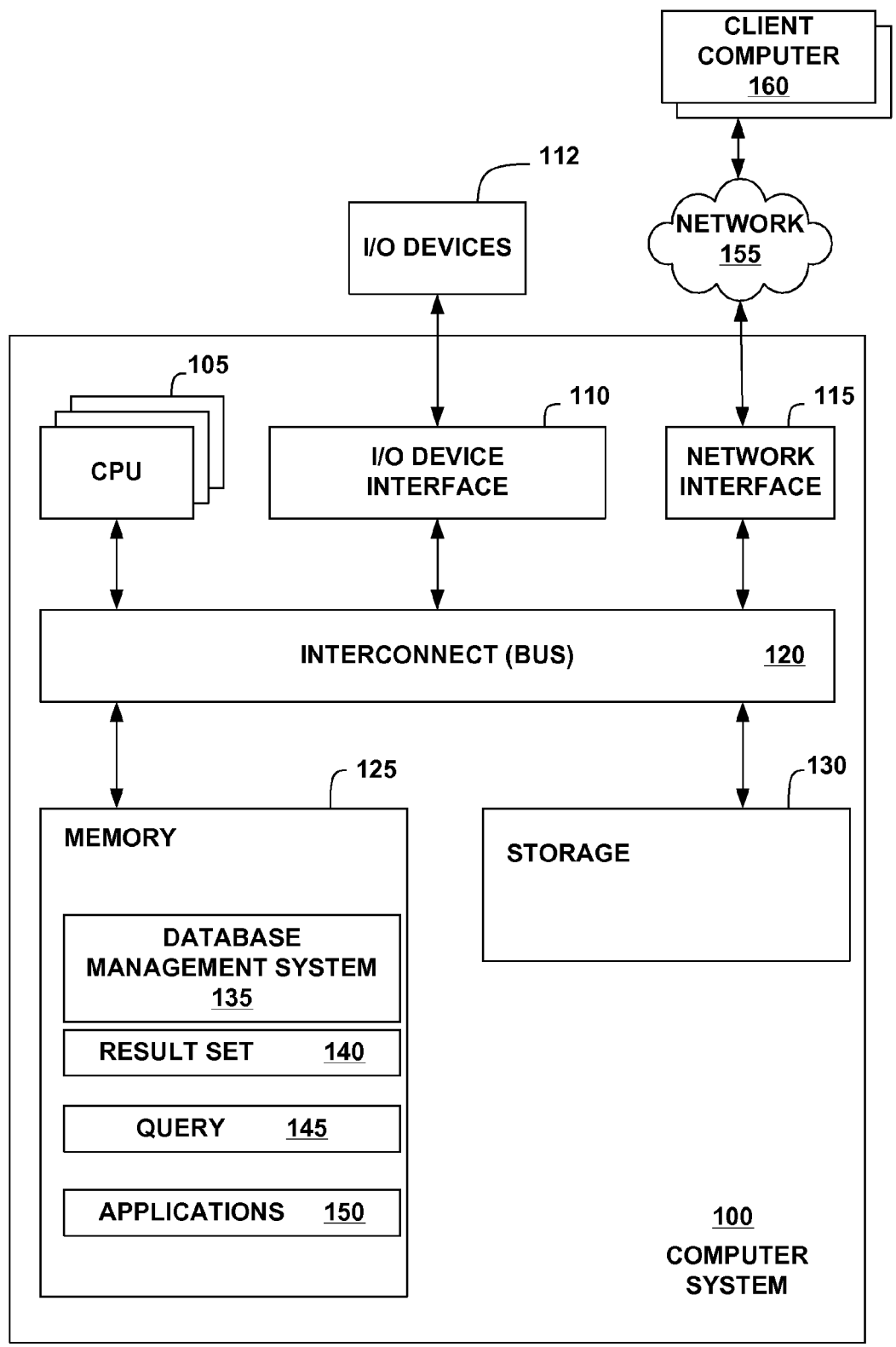
FIG. 1 depicts a high-level block diagram of an example system for implementing an embodiment of the invention.

A database is a structured collection of data. The data may be organized to model relevant aspects of information. For example, a database may contain information on customer interaction with a merchant, such as sales data. The information in the database may be used by the merchant to support processes requiring this information. For example, the database information on sales may be used to support accounting or manufacturing processes. A database management system (DBMS) may be used for accessing data stored in a database. The DBMS may use an index to assist with accessing the database. The index may allow for faster more efficient searches and accessing of the database. The index may be considered a database and treated as such by programs and methods applied to databases. The database data, DBMS, and index may collectively be called a database system. In various embodiments, the database system may omit either the index or DBMS.

A database may periodically be reorganized. This reorganization may also be known as reorganizing a table, optimizing a database, optimizing a table, or numerous other terms that would be known by one skilled in the art. The reorganization may include a variety of activities that modify the data in the database. The reorganization may remove unneeded data. The reorganization may rearrange data contained in the database. The rearrangement of data may be done to improve access time when retrieving data from the database. It may also be done to reduce power consumption or wear and tear on systems containing the database when the database is accessed.

For embodiments in which the database has an index, when the database is reorganized, the index may also be reorganized. The reorganization of the index may be done to reflect changes in the database due to the reorganization. In various embodiments, the database and index may be reorganized separate and independent of each other. The index may be reorganized independently of the database in which case it may be considered a database unto itself. The index may be reorganized for reasons previously mentioned for reorganizing a database.

When a database is reorganized and the data within is rearranged, often similar categories of data are gathered and stored together within the database. In various embodiments a category of data may be data of similar types, values, or keys. As previously mentioned, this may improve access time when retrieving this data from the database. For example, a database may contain all sales transactions for a company. The sales transactions may be initially recorded in the database in chronological order. The database may later be reorganized by categories of data, such as customer number or product instead. Such reorganization may allow for faster access when retrieving data for common queries by a sales force, for example. Such reorganization of the data may be performed regularly since the addition of new data added to the database may reduce the efficiency of retrieving data from the database. For example, after reorganizing a database by customer number, all data for customer B may be located in a specific area of the database allowing for an efficient retrieval of data for customer B. Over time as customer B has additional transactions recorded in the database the new transactions may be added to the end of the database and mixed in with other customer transactions leading to inefficiency when retrieving data on customer B. This inefficiency may grow with each data entry until the database is again reorganized.

In one embodiment, the present invention may increase efficiency in accessing the database caused by new entries by adaptively allocating space during reorganization in the database for various categories of entries. By selecting from a plurality of predictive sizing calculations for determining the amount of space to add to the database for additional entries in the database for a category of data, the database may maintain an efficient form and organization between reorganizations. The selection between multiple predictive sizing calculations for allocating space for future entries during reorganization may result in a more precise allocation of space between reorganizations compared to a generic allocation of space or the use of a single calculation. These may result in allocations of space for additional entries that may be either too small and result in disorganized addition to the end of the database previously mentioned or too great resulting in the database being inefficiently large. By selecting from a plurality of calculations, the space allocated may be adapted prior to reorganization, effectively adapting the future space needs for various types of entries to the database. The ability to select from multiple predictive calculations may allow the system to determine and choose the best predictive calculation for each category of data in the database with every reorganization.

FIG. 1 illustrates an example representation of a computer system 100 connected to one or more client computers 160 via a network 155, according to some embodiments. For the purposes of this disclosure, computer system 100 may represent practically any type of computer, computer system, or other programmable electronic device, including but not limited to, a client computer, a server computer, a portable computer, a handheld computer, an embedded controller, etc. In some embodiments, computer system 100 may be implemented using one or more networked computers, e.g., in a cluster or other distributed computing system.

The computer system 100 may include, without limitation, one or more processors (CPUs) 105, a network interface 115, an interconnect 120, a memory 125, and a storage 130. The computer system 100 may also include an I/O device interface 110 used to connect I/O devices 112, e.g., keyboard, display, and mouse devices, to the computer system 100.

Each processor 105 may retrieve and execute programming instructions stored in the memory 125 or storage 130. Similarly, the processor 105 may store and retrieve application data residing in the memory 125. The interconnect 120 may transmit programming instructions and application data between each processor 105, I/O device interface 110, network interface 115, memory 125, and storage 130. The interconnect 120 may be one or more busses. The processor 105 may be a single central processing unit (CPU), multiple CPUs, or a single CPU having multiple processing cores in various embodiments. In one embodiment, a processor 105 may be a digital signal processor (DSP).

The memory 125 may be representative of a random access memory, e.g., Static Random Access Memory (SRAM), Dynamic Random Access Memory (DRAM), read-only memory, or flash memory. The storage 130 may be representative of a non-volatile memory, such as a hard disk drive, solid state device (SSD), or removable memory cards, optical storage, flash memory devices, network attached storage (NAS), or connections to storage area network (SAN) devices, or to a data cloud, or other devices that may store non-volatile data. The network interface 115 may be configured to transmit data via the communications network 155.

The memory 125 may include a DBMS 135, a result set 140, a query 145, and applications 150. Although these elements are illustrated as residing in the memory 125, any of the elements, or combinations thereof, may reside in the storage 130 or partially in the memory 125 and partially in the storage 130. Each of these elements will be described in greater detail in accordance with FIG. 2.

The network 155 may be any suitable network or combination of networks and may support any appropriate protocol suitable for communication of data and/or code to/from the server computer system 100 and the client computer system 160. In some embodiments, the network 155 may support wireless communications. In other embodiments, the network 155 may support hardwired communications. The network 155 may be the Internet and may support Internet Protocol in some embodiments. In other embodiments, the network 155 may be implemented as a local area network (LAN) or a wide area network (WAN). The network 155 may also be implemented as a cellular data network. Although the network 155 is shown as a single network in the figures, one or more networks of the same or different types may be included.

The client computer system 160 may include some or all of the hardware and software elements of the computer system 100 previously described. As shown, there may be one or more client computers 160 connected to the computer system 100 via the network 155. In some embodiments, one or more client computers 160 may send a query 145 by network 155 to computer system 100 and receive a result set 140.

Figure 2:
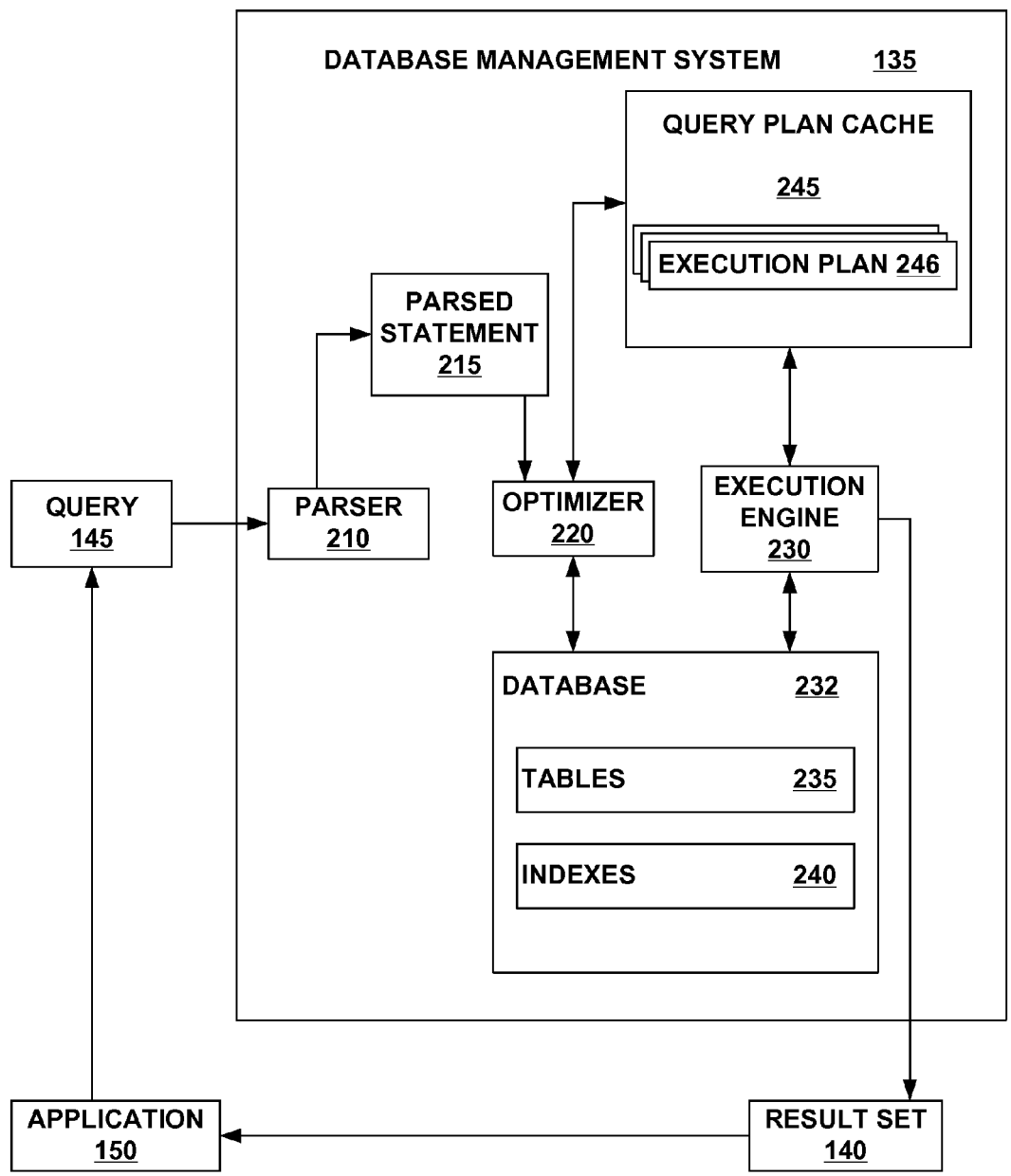
FIG. 2 depicts a block diagram of an example database management system, according to an embodiment of the invention.

FIG. 2 illustrates a block diagram of an example DBMS 135, according to an embodiment of the invention. The DBMS 135 may include a parser 210, an optimizer 220, an execution engine 230, query plan cache 245, and a database 232. The parser 210 may receive a database query 145 from an application 150. In some embodiments, the database query 145 may be in the form of a Structured Query Language (SQL) statement. The parser 210 may generate a parsed statement 215. The parser 210 may send the parsed statement 215 to the optimizer 220. The optimizer 220 may attempt to optimize the parsed statement 215. In some embodiments, optimizing may improve the performance of the database query 145 by, for example, reducing the amount of time it takes to provide a user with a response. The optimizer 220 may generate an execution plan 246, which may be maintained in a query plan cache 245, according to some embodiments. The query plan cache 245 may include one or more execution plans 246, including the current execution plan as well as previously used execution plans 246. Once an execution plan 246 is generated, the execution plan 246 may be sent to the execution engine 230. The execution engine 230 may execute the query 145. Executing the query 145 may include finding and retrieving data in the database tables 235 that satisfies the criteria supplied in the query 145. The execution engine 230 may store the data returned matching the query 145 in a result set 140. The DBMS 135 may return the result set 140 to an application 150, such as the application in which the database query 145 was generated, as a response to the database query 145.

A database 232 may include one or more tables 235 and, in some embodiments, one or more indexes 240. A database table 235 may organize data into rows and columns. Each row of a database table 235 may correspond to an individual entry, a tuple, or a record in the database 232. A column may define what is stored in each entry, tuple, or record. In some embodiments, columns of a table 235 may also be referred to as fields or attributes. The value stored in a column may be used to define a category of data of an entry. For example, a column may store a customer number of product identifier. Each table 235 within the database 232 may have a unique name. Each column within a table 235 may also have a unique name. A row, tuple, or record, however, within a particular table 235 may not be unique, according to some embodiments.

An index 240 may be a data structure that may be used to inform the DBMS 135 of the location of a particular record within a table 235. In some embodiments, the execution engine 230 may use the one or more indexes 240 to locate data within a table 235. In other embodiments, the execution engine 230 may scan the tables 235 without using an index 240.

Figure 3A:
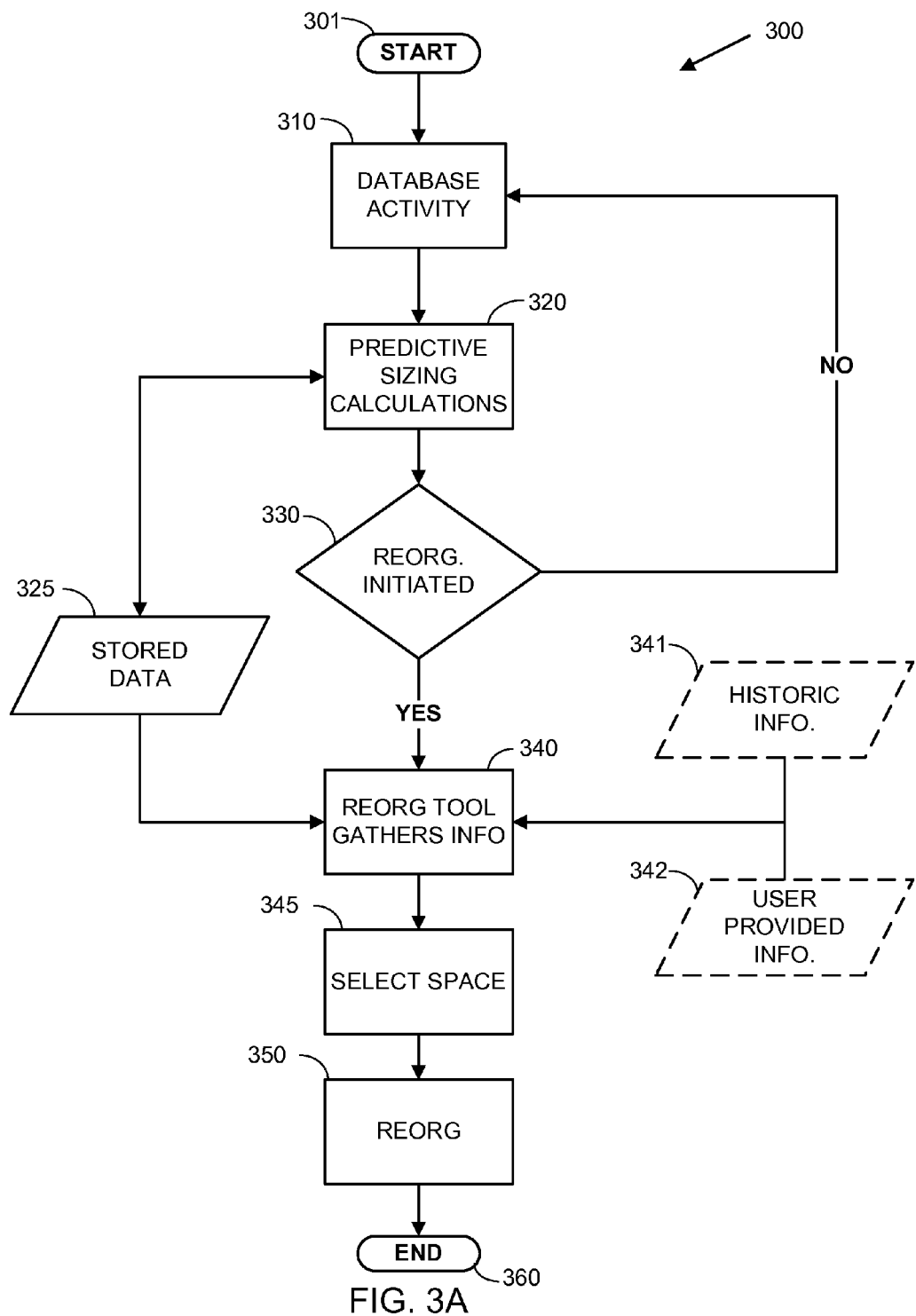
FIG. 3A is a flowchart illustrating a method 300 that uses an adaptive allocation for creating allocated spaces for future data entries in a database during reorganization, according to an embodiment of the invention.

FIG. 3A is a flowchart illustrating a method 300 that uses an adaptive allocation for creating spaces for future data entries in a database during reorganization, according to an embodiment of the invention. The method may start at block 301. In block 310, a database activity takes place. The database activity may be, for example, an additional data entry, the deletion of a data entry, or the modification of data within the database.

A plurality of predictive sizing calculations may be performed in block 320 based upon the occurrence of an event. In the embodiment shown in FIG. 3A, the event may be the database activity. In other embodiments, the event may be a period of time or user command. A regular or periodic running of the predictive calculation may be done in some embodiments to reduce the workload and time of running the predictive calculations during reorganization. In the shown embodiment, the calculation occurs after each database activity. In other embodiments, the calculation may be at various frequencies. For example, the calculation may be run hourly, daily, or weekly. The frequency may be determined based upon the needs of the database or the type of data.

In various embodiments, the predictive sizing calculations may differ based upon the type of database activity or the type of data related to the activity. The predictive sizing calculations may also vary for each category of data. In various embodiments, the predictive sizing calculation may factor in such information as the data type or category, the frequency of activity for that data category, information contained within the data entry, time since last reorganization, deviance from typical database activities, and statistical breakdowns for all or specific database activities. Any similar ways to analyze the database entries and adapt the space allocation for additional entries of different categories of data in the database are contemplated within the scope of the invention.

The predictive sizing calculations may be used to create an allocation of space for additional data entries of a category of data in the database. The predictive calculations 320 may also provide guidance as to when the next reorganization may be beneficial. The result of the predictive calculations 320 for various data types may be retained in stored data 325 for future use during reorganization as discussed below. The stored data 325 may be stored in any of the forms of the storage 130, memory 125, or dedicated storage for the adaptive allocation, or in any alternate storage available to the system such as the cloud.

In block 330, the system determines if reorganization has been initiated. If the answer is "NO" then the method cycles back to block 310. Database activity continues to occur and the predictive sizing calculations 320 may continue to be run and the updated results retained in stored data 325. If the answer is "YES" then the method may proceed to block 340. In various embodiments, the reorganization may be initiated based upon a schedule programmed into the system or software able to access the system. In other embodiments, the reorganization may be initiated by a user. In other embodiments, the reorganization may be initiated based upon the result of one or more of the predictive sizing calculations. The reorganization may be delayed, postponed, or rescheduled based upon system or database usage, resources available, or expected events or timetables.

In block 340, a reorganization tool gathers information for the database reorganization. As previously mentioned, the reorganization tool may be part of the DBMS 135 or may be separate software or hardware from it. The information gathered by the reorganization tool may include, but is not limited to, the stored data 325 which may include the results of the predictive sizing calculations 320, optional historical information 341, and optional user provided data 342. The historical information 341 may include information or factors from the past that may be relevant to current reorganization or allocation of space for categories of data. The historical information may include information for selecting from the results of the predictive sizing calculations 320 to be used during reorganization. For example, the historical information 341 may include the historical trend of the first predictive sizing calculation to be 95% accurate for predictions in the fourth quarter for product A. In another example, the historical information 341 may include the fact that for product A sales double every winter period. In various embodiments, the historical information 341 may already be integrated into the one of the predictive calculations 320 done previously.

The user provided information 342 may include a variety of information and preferences supplied by a user for use in the reorganization. The user supplied information may be called user input in various embodiments. In various embodiments, the user provided information 342 may indicate plans for preferences of the user that may affect the database allocation. For example, the user provided information 342 may include the end of production for a product that has data entries about it stored in the database. In various embodiments, this may include information about the start of a new category of data, such as a new product, which has no data yet. In various embodiments, some or all user provided information 342 may already be integrated into one or more of the predictive calculations 320 done previously. For example, the predictive calculations may have information on product lifecycle, such as production termination dates, which may have already been factored in to the predictive sizing calculations 320. In various embodiments the selected amount of space in block 345 may be adjusted based upon the user input.

In block 345, an amount of space to add to the database for additional entries of a category of data may be selected. In one embodiment, this may involve the use of results of the predictive calculation 320 retrieved from stored data 325, optional historical information 341, and optional user provided data 342. In other embodiments, other information or data may be factored into the selection of the space selected for the allocation. In various embodiments, the use of historical information 341, user provided information 342, or data from stored data 325 may be used in the selection between predictive sizing calculations 320. For example, the stored data 325 may contain a historical accuracy for each predictive sizing calculation 320 for each product in the database, the historical information 341 may contain historical supplier capabilities, and user provided information 342 may contain information on competitor products. In this example, the reorganization tool may use this combination of information to select between the predictive sizing calculations 320 for the one most accurate for a category of data. Any similar ways to create, use, select, and apply the predictive calculations 320 in allocating an amount of space for additional entries for a category of data during reorganization of a database are contemplated as being within the scope of the invention. In various embodiments, the selection of space 345, information gathered by the reorganization tool in 340, and the predictive sizing calculations may individually or entirely be different for each category of data in the database.

In block 350, the reorganization of the database occurs. The reorganization may include the final allocation of selected space 345. The allocation may include reserved locations, or allocated spaces, in the database being reorganized for additional data entries of a category of data. In block 360, the method ends with the reorganization of the database complete and the allocated space included for additional entries.

Figure 3B:
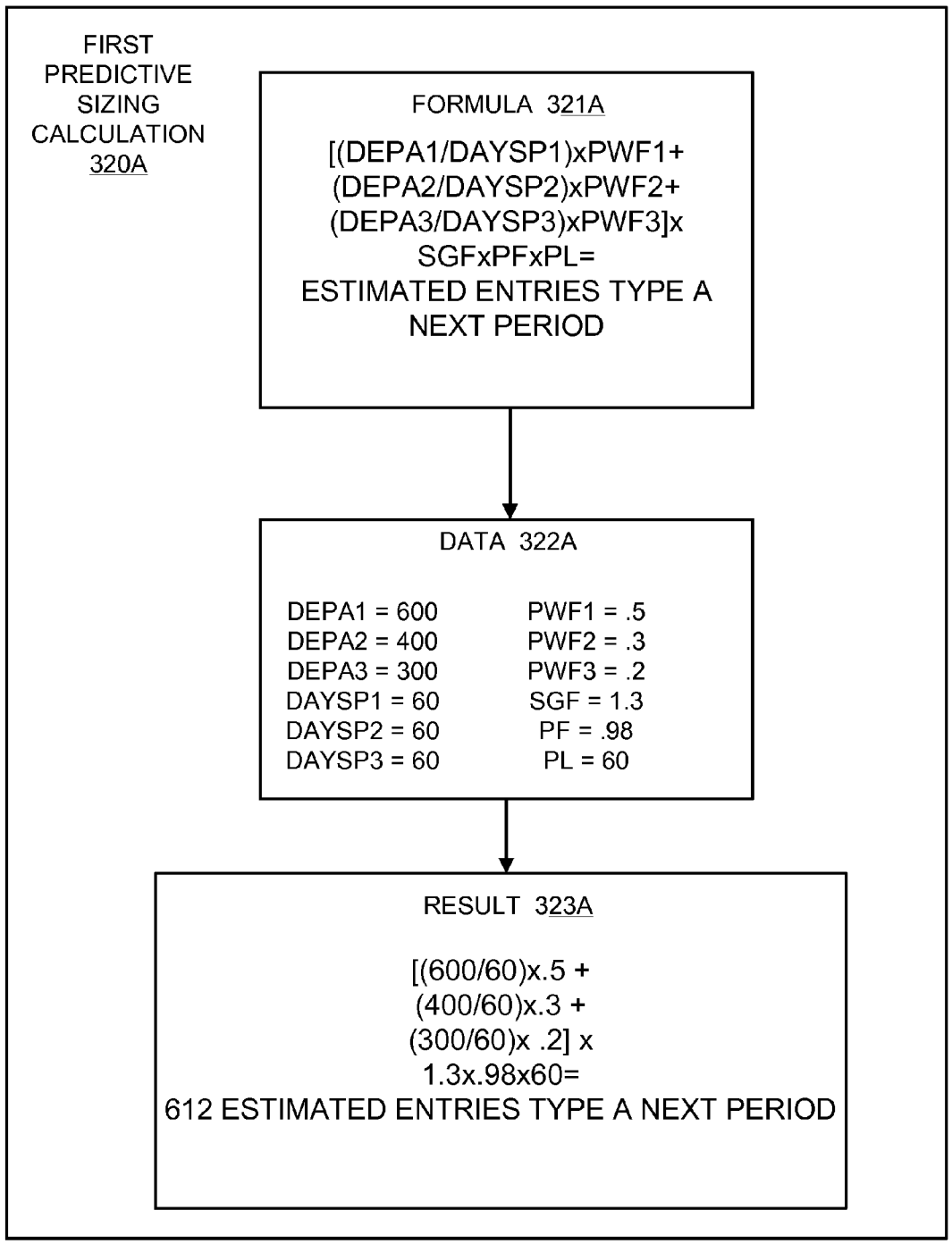
FIG. 3B is a detailed illustration of a first predictive sizing calculation that may be found in block 320 of FIG. 3A, according to an embodiment of the invention.
Figure 3C:
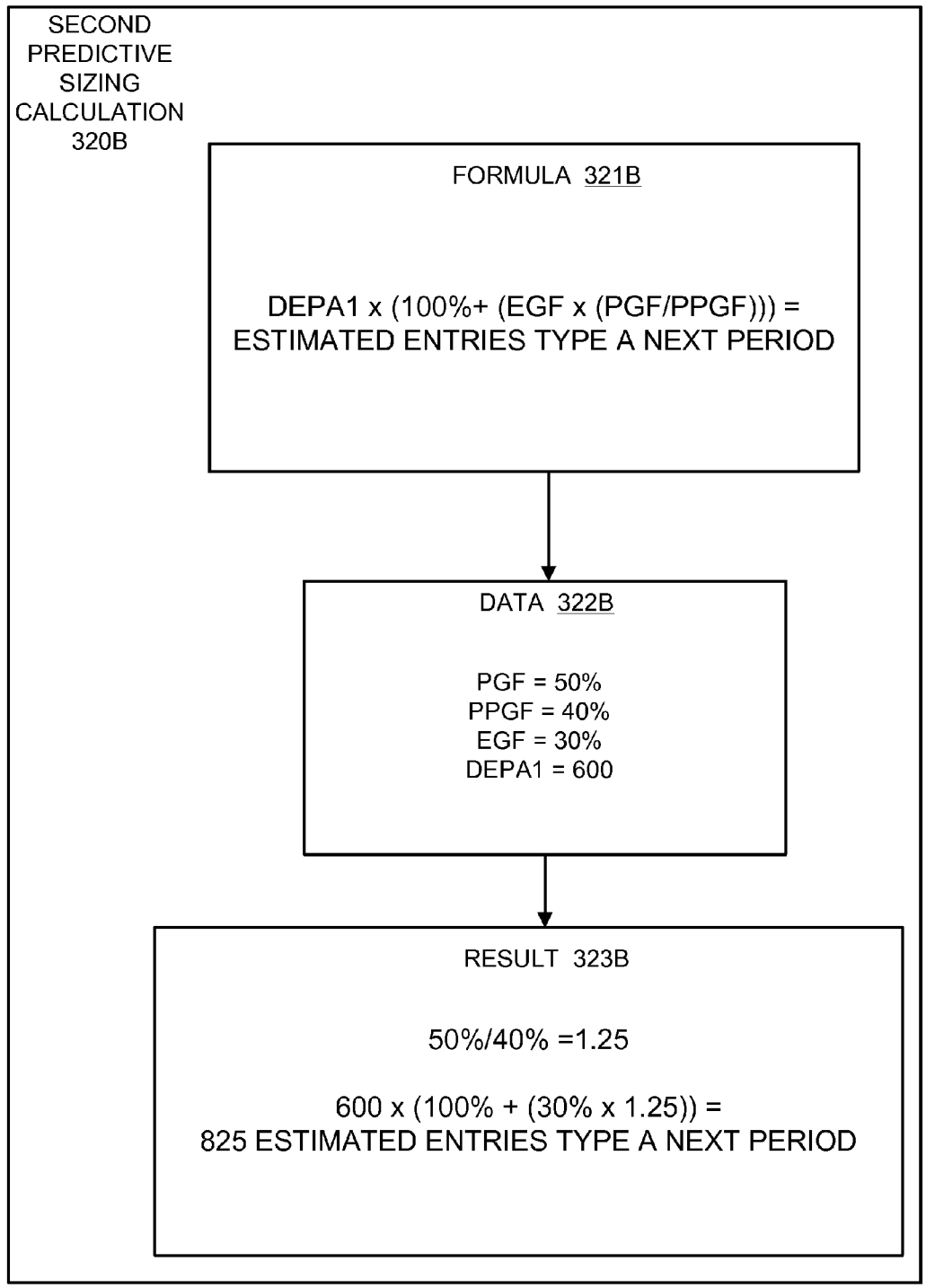
FIG. 3C is a detailed illustration of a second predictive sizing calculation that may be found in block 320 of FIG. 3A, according to an embodiment of the invention

FIGS. 3B and 3C are detailed examples of first and second predictive sizing calculations, 320A and 320B respectively, that may occur in block 320 in FIG. 3A. In FIG. 3B, an example first predictive sizing calculation 320A is shown including the formula 321A, data 322A, and the result 323A. In this example, the first predictive sizing calculation 320A may provide a value, found in result block 323A, that is an estimated number of additional entries of a category of A type data during a period following a reorganization. This value is determined by using the data 322A in combination with the formula 321A to get result 323A.

In the embodiment, the formula 321A starts by having data entries of category A during period 1 (DEAP1) be divided by the number of days in period 1 (DAYSP1) and then multiplied by a period weighting factor for period 1 (PWF1). PWF1 and other factors used in the calculation are described below. This value is then added to the result of the data entries of category A during period 2 (DEAP2) divided by the number of days in period 2 (DAYSP2) and then multiplying the result by a period weighting factor for period 2 (PWF2). The new value may then be added to the result of the data entries of category A during period 3 (DEAP3) divided by the number of days in period 3 (DAYSP3) and then multiplying the result by a period weighting factor for period 1 (PWF1). This combined value may be then multiplied by a sales growth factor (SGF), a period factor (PF), and a period length for the period following the reorganization (PL). These factors are exemplary only and a variety of factors may be included in the formula 321A. In various embodiments, seasonal factors may be used to adjust the result of the calculation 320A. In some embodiments, the formula may tell us the final result will be a value that is a predicted number of additional entries of category A in the database per time period, such as entries per day.

To determine a value for the first predictive sizing calculation 320A required data 322A may be inserted into the formula 321A. This data 322A may be provided by different sources. In various embodiments, this data may be provided by the stored data 325, storage 130, the memory 125, or remote storage of the computer system 100. In various embodiments, the data may be previously determined, stored, and retrieved for the first predictive sizing calculation 320A or it may be generated when needed for first predictive sizing calculation 320A. For example, periods in this embodiment may be the time between reorganizations. Period 1 may be the time period since the last reorganization and be calculated for each adaptive calculation. Period 2 may be the time period between the last reorganization and the reorganization previous to it, and period 3 may be the time period between the second to last reorganization and the reorganization previous to it. Both the time of period 2 and 3 may be stored data that is retrieved.

In this embodiment, several other factors for the formula 321A may be in data 322A. These include the DEPA1-3, PWF, SGF, PF, and PL. The values in the data 322A provide an example of how various factors and data may be used in the first predictive sizing calculation 320A. In this embodiment, PWF is a factor that may adjust how much values for a given period weigh into the final value. For example, the declining value of PWF1-3, wherein PWF1 is greater than PWF2 or PWF3, may indicate that the newer period information is considered more relevant to estimates of the future trends. In this embodiment, the SGF may be a factor based upon marketing and advertising expectations sales. In the example, the value of the SGF being greater than 1 may indicate that the product is considered in a growth cycle of sales. In the embodiment, the PF may be a factor that is based upon historic trends. The PF being less than 1 may indicate that the next period is during a historical period of slower sales. For example, the months of January through March see a sales decline due to the end of the holiday period. The values in the data 322A are for example only, and the reasons for any value or factor in the data may vary considerably. One skilled in the art will recognize the variety and reasoning behind such values and factors.

As previously mentioned for various embodiments, the calculation for each data type or category may differ. For example, each category of data may use different factors or mathematical equations. In various embodiments, the use of periods, days, or other factors or values may be renamed, more numerous, modified, or absent from the calculation. In other embodiments, the lookup of data in a table may be considered a predictive sizing calculation. The illustrated embodied first predictive sizing calculation 320A is an exemplary embodiment only and not meant as limitation of possible embodiments. One skilled in the art would recognize the variety and complexity of potential predictive sizing calculations 320 that may be used. The resulting value from the first predictive sizing calculation 320A may be the stored in stored data 325 for future use.

In this example, the second predictive sizing calculation 320B is illustrated in FIG. 3C. In the example, the second predictive sizing calculation 320B is shown including the formula 321B, data 322B, and the result 323B. In this example, the second predictive sizing calculation 320B may provide a value, found in result block 323B, that is a prediction of the number of additional entries of category A type data for the period following reorganization. This value may be determined by using the data 322B in combination with the formula 321B to get result 323B.

In this example, the formula 321B uses the data entries of category A during period 1 (DEPA1) multiplied by a percentage value. The formula 321B determines this percentage value by starting with 100% and adding the result of multiplying an estimated growth factor (EGF) by the result of a period growth fact (PGF) divided by the predicted period growth factor (PPGF).

In this embodiment, the data 322B shown may be calculated, determined, or found as previously mentioned for data 322A in FIG. 3B. Using the example data, the formula of this embodiment compares the PGF to the PPGF which may give it a variance from the projection to apply to the EGF. By doing this, the adaptive calculation 320B may adapt an EGF for the product to the actual sales results. This adaption may result in improved estimates for category A type data in the period following reorganization. As shown in the results 323B, using the example data the EGF is modified by 25% and the predicted value of the number of additional entries of category A type data during the next period may be determined. Similar to FIG. 3B, the embodiment illustrated in FIG. 3C is provided for example only and not meant to limit the scope of invention.

Figure 4:
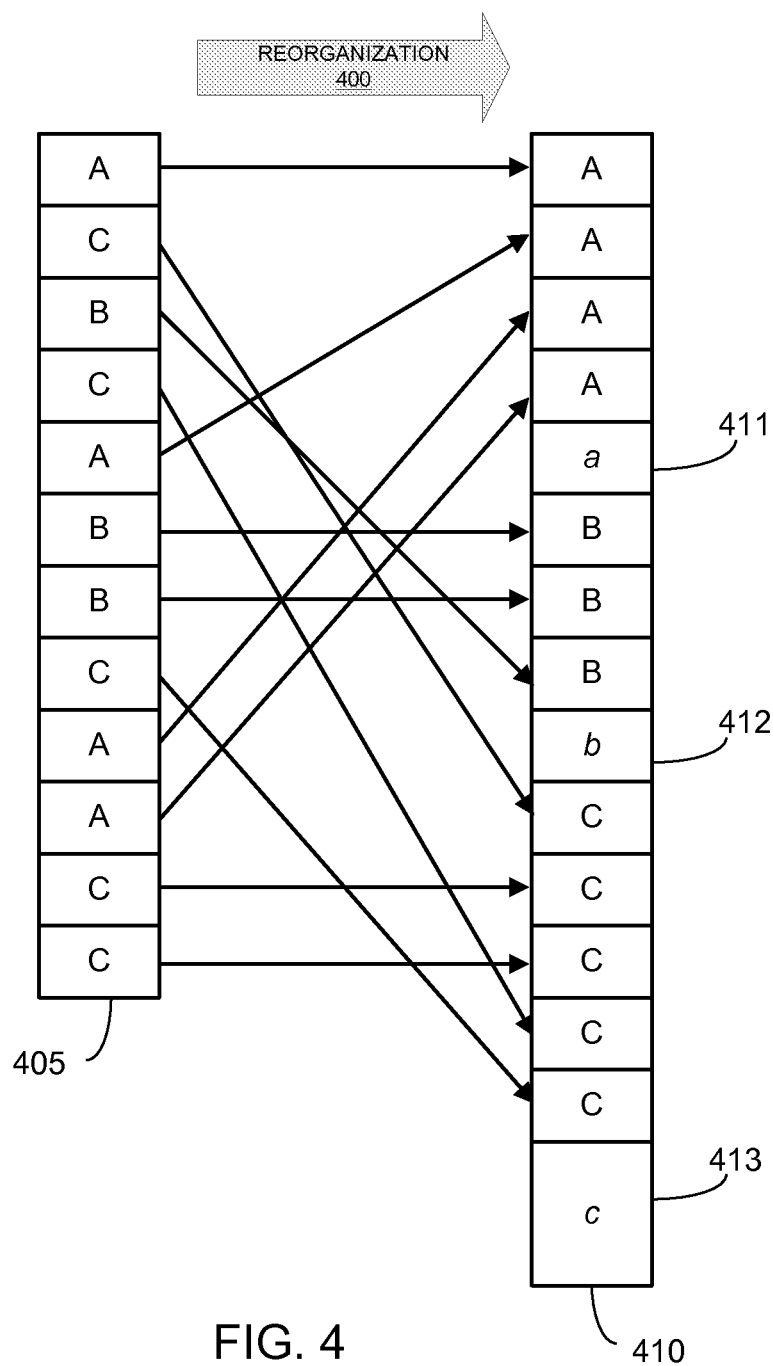
FIG. 4 is a block diagram of a first reorganization of the database, according to an embodiment of the invention.

FIG. 4 is a block diagram of a database reorganization, according to one embodiment. The transactions are initially entered into the database based in chronological order. The database may undergo reorganization 400 resulting in arrangement 410 of the data that includes allocations of space for additional entries of categories of data. The data may be arranged to group similar type or categories of entries together. In the example, the entries may be arranged by customer or product. The arrangement may organize based on one factor or on several. For example, the data may be arranged primarily by customer and then secondarily by product purchased. In another example, the data may be arranged by customer but done in such a way as to use the least amount of time or resources to do the reorganization 400. The variety and mixture of rearrangements that may be done during reorganization 400 would be recognized by one skilled in the art.

In the example, the reorganization of the database in FIG. 4 starts with the data arrangement 405. The database undergoes a reorganization 400 during which data entries are rearranged into the order shown by data arrangement 410. In the illustrated example, additional allocated spaces a 411, b 412, c 413 are created in the database for future, or additional, data entries of similar data as the local category of data in the database. These allocated spaces may contain no information at the time of the reorganization and may be reserved for future entries. The DBMS may assign data to them when it is recognized to meet determined requirements for that category in the database. For example, the requirement for a category may be to have a specific customer or product in the entry. The requirements for the allocated location may be similar to those that defined the rearrangement during the reorganization. The variety and nature of the allocations would be recognized by one skilled in the art. The amount and requirements for the allocation of the additional spaces may be determined using the adaptive calculation.

As previously mentioned, the use of multiple calculations may allow for the space allocated being adapted each time reorganization occurs. In this example, a series of selected predictive sizing calculation may have been used to determine the allocations for data entries similar to the "A", "B", and "C" type categories. The result may be that the allocation is not equal for each category. In the example, the allocation of assigned space for additional data entries of category C type data, in c 413, is larger than the allocated space for "A" and "B" type data entries in allocated space a 411 and b 412, respectively. The amount of space allocated for additional entries of each category may vary based upon the selection between the first and second predictive sizing calculations. For example, the space allocated for a 411 may have been selected from predictive sizing calculations examples shown in FIGS. 3B and 3C. The amount of size shown may be result of selecting the calculation and resulting value of FIG. 3B. This may mean that a 411 is space for 612 entries of type A data. Had the selection been the calculation and resulting value of FIG. 3C the a 411 may have a larger amount of space similar to the c 413. As previously mentioned the reorganization may include additional space for entries in the index for the database.

Exemplary embodiments have been described in the context of a fully functional system for creating allocated spaces for additional entries in a database for a category of data during reorganization. The size of these allocated spaces being determined using the selection between a plurality of predictive sizing calculations 320. Readers of skill in the art will recognize, however, that embodiments also may include a computer program product disposed upon computer-readable storage medium or media (or machine-readable storage medium or media) for use with any suitable data processing system or storage system. The computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer or storage system having suitable programming means will be capable of executing the steps of a method disclosed herein as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the claims.

As will be appreciated by one skilled in the art, aspects may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be used. The computer readable medium may be a computer-readable signal medium or a computer-readable storage medium. The computer readable signal medium or a computer readable storage medium may be a non-transitory medium in an embodiment. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire, optical fiber cable, RF, etc., or any suitable combination of the foregoing.

Computer program code for carrying out operations for aspects may be written in any combination of one or more programming languages, including an object-oriented programming language such as Java, Smalltalk, C++ or the like and conventional procedural programming languages, such as the C programming language or similar programming languages. The program code may execute entirely on the user's computer, partly on the user's computer, as a stand-alone software package, or on one module or on two or more modules of a storage system. The program code may execute partly on a user's computer or one module and partly on a remote computer or another module, or entirely on the remote computer or server or other module. In the latter scenario, the remote computer other module may be connected to the user's computer through any type of network, including a local area network (LAN) or a wide area network (WAN), or the connection may be made to an external computer (for example, through the Internet using an Internet Service Provider).

Aspects are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart, or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions or acts specified in the flowchart, or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terms "server and "mobile client" are used herein for convenience only, and in various embodiments a computer system that operates as a mobile client computer in one environment may operate as a server computer in another environment, and vice versa. The mechanisms and apparatus of embodiments of the present invention apply equally to any appropriate computing system, including a computer system that does not employ the mobile client-server model.

While this disclosure has described the details of various embodiments shown in the drawings, these details are not intended to limit the scope of the invention as claimed in the appended claims.

What is claimed is:

1. A non-transitory computer-readable storage medium having executable code stored thereon to cause a machine to reorganize a database, the reorganization comprising:
   identifying a first category of database entries;
   performing a first predictive sizing calculation by adjusting a number of database entries of the first category in a first period of time by a period factor;
   identifying, based on the first predictive sizing calculation, a first estimated number of database entries of the first category in a time period following the reorganization;
   performing a second predictive sizing calculation by adjusting an estimated growth of the database entries of the first category for the time period following the reorganization by a quotient of a second period's actual growth and an estimated growth of the second period;

identifying, based on the second predictive sizing calculation, a second estimated number of database entries of the first category in the time period following the reorganization;

determining, based on historical seasonal accuracy information for the first predictive sizing calculation and the second predictive sizing calculation for the first category, which of the first predictive sizing calculation and the second predictive sizing calculation is likely to be more accurate;

selecting, based on the determining, the first estimated number of database entries or the second estimated number of database entries; and increasing, for the time period following the reorganization and for the first category, the database by an amount of space corresponding to the selected number of database entries.

2. The non-transitory computer-readable storage medium of claim 1, wherein the first category is limited to database entries for a particular customer.

3. The non-transitory computer-readable storage medium of claim 1, wherein the first category is limited to database entries related to a particular product.

4. The non-transitory computer-readable storage medium of claim 1, wherein the historical seasonal accuracy information relates to the accuracy of the first predictive sizing calculation and second predictive sizing calculation for a particular quarter over a set of years.

5. The non-transitory computer-readable storage medium of claim 1, wherein the period factor is historical information identifying the period of time following the reorganization as a slow sales period.

6. The non-transitory computer-readable storage medium of claim 1, wherein the database is reorganized once per quarter of a calendar year.

7. The non-transitory computer-readable storage medium of claim 6, wherein the first time period, second time period, and time period following the reorganization are quarters of a calendar year.

8. The non-transitory computer-readable storage medium of claim 6, wherein the second predictive sizing calculation is adjusted based on information regarding competitor products.

9. The non-transitory computer-readable storage medium of claim 6, wherein the second predictive sizing calculation is adjusted based on historical information related to supplier capabilities.

* * * * *